(12) United States Patent
Limpert et al.

(10) Patent No.: US 8,899,894 B2
(45) Date of Patent: Dec. 2, 2014

(54) DEVICE FOR FASTING A COMPONENT TO A FASTENING STUD

(75) Inventors: Alexander Limpert, Weikersheim (DE); Stephan Sporlein, Hirschaid (DE); Martin Kluge, Rottingen (DE)

(73) Assignee: Illinois Tool Works, Inc., Glenview, IL (US)

( * ) Notice: Subject to any disclaimer, the term of this patent is extended or adjusted under 35 U.S.C. 154(b) by 184 days.

(21) Appl. No.: 13/637,648

(22) PCT Filed: May 16, 2011

(86) PCT No.: PCT/EP2011/002411
§ 371 (c)(1),
(2), (4) Date: Sep. 26, 2012

(87) PCT Pub. No.: WO2011/160746
PCT Pub. Date: Dec. 29, 2011

(65) Prior Publication Data
US 2013/0028681 A1 Jan. 31, 2013

(30) Foreign Application Priority Data
Jun. 22, 2010 (DE) .......................... 10 2010 024 870

(51) Int. Cl.
*F16B 37/04* (2006.01)
*F16B 37/08* (2006.01)
*F16B 41/00* (2006.01)

(52) U.S. Cl.
CPC ........... *F16B 41/002* (2013.01); *F16B 37/0857* (2013.01); *F16B 37/043* (2013.01)
USPC ............................ 411/108; 411/433; 411/437

(58) Field of Classification Search
USPC .......... 411/103, 108, 109, 111–113, 433, 437
See application file for complete search history.

(56) References Cited

U.S. PATENT DOCUMENTS

| 4,579,493 A | * | 4/1986 | Schaty | ........................... 411/510 |
| 4,828,444 A | * | 5/1989 | Oshida | ........................... 411/437 |

(Continued)

FOREIGN PATENT DOCUMENTS

| DE | 19944685 A1 | 3/2001 |
| EP | 1350712 A2 | 10/2003 |

OTHER PUBLICATIONS

An International Search Report, dated Sep. 20, 2011 in International Application No. PCT/EP2011/002411.

*Primary Examiner* — Roberta Delisle
(74) *Attorney, Agent, or Firm* — Lowe Hauptman & Ham LLP

(57) ABSTRACT

A device for fastening a component to a fastening stud includes a holding member and a holding disk for contacting first and second surfaces of the component, respectively. The holding member and holding disk are preliminarily connected with one another, without the fastening stud, each in the state contacting the component. The holding disk has fastening projections and at least one elastic member which prohibits the fastening projections from contacting the second surface of the component, so that the device is moveable with regard to the component in a direction perpendicular to the moving direction of the fastening stud through a through hole of the holding disk. The elastic member is elastically deformed upon mounting of the fastening stud through the through holes of the holding disk and the component, such that the fastening projections contact the second surface of the component.

20 Claims, 4 Drawing Sheets

(56) References Cited

U.S. PATENT DOCUMENTS

Figure 1:
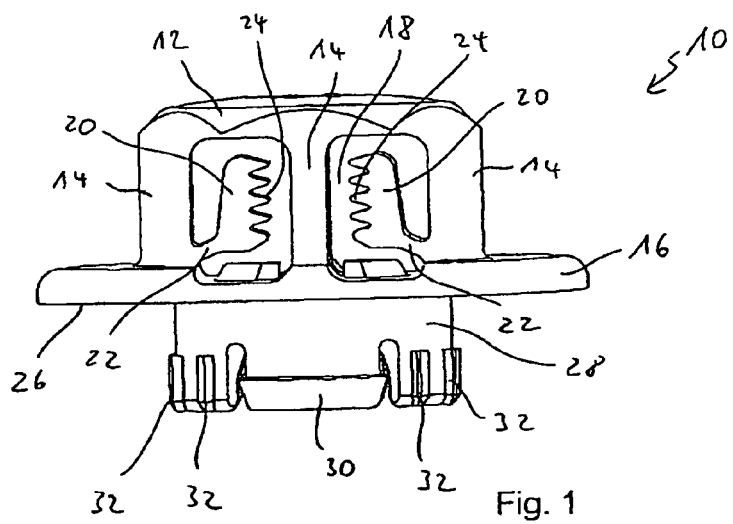

| | | | |
|---|---|---|---|
| 4,850,778 A * | 7/1989 | Clough et al. | 411/433 |
| 5,660,513 A * | 8/1997 | Shibanushi | 411/433 |
| 6,824,203 B2 * | 11/2004 | Kanie | 296/204 |
| 7,036,875 B2 | 5/2006 | Kanie | |
| 8,007,029 B2 * | 8/2011 | Sano | 296/180.1 |
| 8,328,488 B2 * | 12/2012 | Luk | 411/433 |
| 2007/0248436 A1 * | 10/2007 | Sano | 411/175 |
| 2009/0096249 A1 * | 4/2009 | Sano | 296/180.1 |

* cited by examiner

DEVICE FOR FASTING A COMPONENT TO A FASTENING STUD

RELATED APPLICATIONS

The present application is the National Phase of International Application No. PCT/EP2011/002411, filed May 16, 2011, and claims priority from, German Application No. 102010024870.3, filed Jun. 22, 2010.

The invention relates to a device for the fastening of a component to a fastening stud, comprising a holding member with a contact surface for contacting a first surface of the component and with an insertion section for a fastening stud being guidable through a through hole of the component, wherein the insertion section comprises at least one holding device for holding the fastening stud, and comprising a holding disk with a through hole for the fastening stud and with a contact surface for contacting a second surface of the component being opposite the first surface.

Such devices are used, for example, to fasten panelling parts on automobile bodies. For this, the corresponding body part is often provided with fastening studs. The holding disk and the holding member can then be fitted on the respective fastening stud together with the component held between them to be fastened. The fastening stud thereby passes through the through hole of the holding disk as well as of the component and is held in the insertion section by the holding device after mounting.

This type of mounting is simple and allows a secure fastening during operation. However, there is a problem in that position tolerances of the fastening studs can often not be sufficiently compared with the known devices. This makes the fastening of the component on the fastening stud more difficult.

Starting from the explained state of the art, the object of the invention is to provide a device of the initially named type with which a balance of production tolerances is possible in a simple manner with simple mounting and an always secure fastening of the component during operation.

This object is solved according to the invention by the subject of claim 1. Advantageous embodiments can be found in the dependent claims, the description and the figures.

For a device of the initially named type, the invention solves the object in that the holding disk comprises a plurality of fastening projections, in that preliminary connection means are provided, with which the holding member and the holding disk can be preliminarily connected with one another without the fastening stud each in the state contacting the component, and in that the holding disk comprises at least one elastic distance member, which prohibits the fastening projections from contacting the second contact surface of the component when the holding member and the holding disk are preliminarily connected with one another, so that the device is moveable with regard to the component in a direction perpendicular to the moving direction of the fastening stud through the through hole of the holding disk, and wherein the distance member is elastically deformed during a mounting of the fastening stud guided through the through holes of the holding disk and the component in the insertion section such that the fastening projections can contact the second contact surface of the component.

The insertion section extends starting from the contact surface of the holding member. It can form for example a mainly cylindrical chamber for the fastening stud. The first contact surfaces of the holding member and the holding disk lie opposite each other in the mounted state. They thus lie on opposite-lying sides of the component on it. The fastening projections of the holding disk are designed to lie against the second contact surface of the component in the state of the fastening stud mounted in the insertion section. In particular, they are designed to grip in the second contact surface of the component in the fully mounted state of the device and thus prevent a twisting of the holding disk and thus the device opposite the component. For this, the fastening projections can be designed for example triangularly in cross-section. Depending on the size of the component opening and the position of the device, it is possible that in the final mounted state only a few of the fastening projections contact or respectively grip in it.

According to the invention, a simple relocatability of the device in the premounted state, i.e. before the mounting on the fastening stud, is enabled in a plane perpendicular to the later insertion direction of the fastening stud. For this, the through hole of the component must naturally be designed large enough so that a section of the holding member gripping, if applicable, through the through hole and/or the holding disk sits with sufficient play in the through hole. In order to permit lateral shifting of the premounted device and in particular of the holding disk provided with the fastening projections, a glidable distance member is provided according to the invention, which prevents the fastening projections from resting on the component in the premounted state. Such resting could otherwise lead to a twisting of the fastening projects, which would impair the relocatability. The device can thus be adjusted in the premounted state to the exact position of the fastening stud before final mounting through insertion of the fastening stud into the insertion section takes place. Thus, any production tolerances can be compensated for in a simple manner. It is simultaneously guaranteed that, after final mounting of the device on the fastening stud, at least some of the fastening projections grip in the respective contact surface of the component and thus securely prevent an undesired loosening of the device during operation.

In the case of this component, it can be a component of an automobile, for example a panelling part of an automobile, which should be fastened on a part of the body of an automobile. The corresponding part of the automobile body can form a second component. Accordingly, the holding member can have a second contact surface (lying opposite its first contact surface) for contacting a surface of the second component. The fastening stud can be permanently connected with the automobile body. It can have for example an external thread, which is held by the holding device of the insertion section in the completely mounted state of the device. The holding disk fulfills the function of a washer. The device according to the invention can also comprise the fastening stud as well as the component to be fastened on the fastening stud and, if applicable, a second component.

The holding member on one hand and the holding disk on the other hand can each be designed as one piece. They can be made of plastic. For example, they can be produced using a plastic injection-molding process.

In accordance with one embodiment, the preliminary connection means can comprise a locking connection. Such a locking connection establishes the preliminary connection between the holding disk and the holding member in a particularly simple manner, while an undesired loosening of the preliminary connection is securely simultaneously avoided. According to another embodiment in this regard, it can be provided that the holding member comprises a cylindrical section insertable into the through hole of the component and that also has a through hole with at least one locking element provided on a free end of the cylindrical section and that the holding disk also has a cylindrical section having a through hole with at least one locking element corresponding with the at least one locking element of the holding member, wherein the cylindrical section of the holding member can be inserted into the cylindrical section of the holding disk and wherein the locking elements lock together for the preliminary connection of the holding member and holding disk. The locking connection can thus take place in particular simply through the sticking together of the holding member and the holding disk from opposite-lying sides of the component. In the preliminarily mounted state, the component is then securely held between the holding member and the holding disk and the final mounting on the fastening stud can take place. For example, one of the at least one locking elements of the holding member or respectively holding disk can be at least one locking projection and the other of the at least one locking elements of the holding disk or respectively holding member can be at least one locking seating corresponding to the locking projection. The free end of the cylindrical section of the holding member is thereby the end of the section facing away from the insertion section.

According to another embodiment, it can be provided that the holding disk in the preliminarily connected state of the holding member and holding disk protrudes over the holding member in a direction opposed to the insertion direction of the fastening stud into the insertion section at least in sections. The holding disk thus protrudes over the holding member in particular in the direction facing a second component provided with the fastening stud, such as a body part, on which the first component should be fastened. If the holding member and holding disk have cylindrical sections as per the aforementioned embodiment, it can be provided that the holding disk, for example its cylindrical section, protrudes over the free end of the cylindrical section of the holding member. The result of these embodiments is that the holding member in the state mounted on a fastening stud does not come in contact with a second component, for example a body part, on which the first component should be fastened. In contrast, the holding disk comes in contact with the fastening stud and/or such a second component during final mounting on the fastening stud. The holding member then acts like a counter bearing such that the holding disk is subjected to a force in the insertion direction of the fastening stud during insertion of the fastening stud into the insertion section of the holding member. This force leads to an elastic deformation of the holding disk and thus the contacting or respectively the gripping of the fastening projections with or respectively in the first component.

According to another embodiment, the cylindrical section of the holding disk can have an inner gearing and the cylindrical section of the holding member an outer gearing, wherein the outer gearing of the cylindrical section of the holding member engages with the inner gearing of the cylindrical section of the holding disk in the condition being inserted in the cylindrical section of the holding disk. In the case of this embodiment, a relative rotation between the holding member and the holding disk is prevented and a torque acting in the course of the mounting of the fastening stud in the device or during later operation can be securely transmitted between the holding member and the holding disk.

In accordance with another embodiment, the holding device of the insertion section can comprise at least two holding arms being elastically connected to an inner surface of the insertion section, wherein the holding arms comprise holding teeth, which are designed for engaging in an outer surface of the fastening stud. Each holding arm can thereby have several teeth. Furthermore, each of the holding arms can be elastically connected to the inner surface of the insertion section on the end facing the insertion opening of the insertion section. The opposite-lying end of the holding arms is free in this embodiment. This connection on the bottom end of the holding arms allows a particularly easy insertion of the fastening stud into the insertion section and simultaneously a high holding force for the fastening stud in the mounted state so that an undesired loosening through vibrations or the like occurring during operation can be excluded. Each of the holding arms can run mainly parallel to the insertion direction of the fastening stud into the insertion section, wherein the teeth extend starting from the holding arms radially into the insertion section. In this embodiment, the fastening stud can simply be pushed into the insertion section, or respectively the device can be pushed with the first component onto the stud fastened for example on a vehicle body.

In accordance with another embodiment, the fastening projections of the holding disk can be fastening ribs extending in the radial direction on the contact surface of the holding disk. Such fastening ribs permit a particularly secure gripping in the second contact surface of the component and thus a particularly good securing from undesired twisting of the device. But other fastening projections are also possible. For example, the fastening projections can be cone-shaped or pyramid-shaped.

According to another embodiment, the elastic distance member of the holding disk can comprise a ring-shaped dome being provided radially outwards of the fastening projections, wherein the holding disk is elastic at least in the area of the dome. In the unstressed state of the holding disk, the dome is higher than the fastening projections so that they cannot contact the first component. During insertion of the fastening stud, the holding disk is pushed centrally in the direction of the component and is thereby deformed into a type of spring plate so that the dome opposite the fastening projections is pushed away from the component. The fastening projections can thereby contact the component and grip in it. The dome can for example be circumferential on the outer edge of the holding disk. The holding disk can also be completely elastic. A dome is particularly well suited due to its continuous geometry as gliding distance member, since there are no edges or the like disrupting the shifting of the device.

According to a further embodiment the ring-shaped dome being provided radially outwards of the fastening projections can be a first ring-shaped dome, wherein the holding disk comprises a second ring-shaped dome, wherein the second ring-shaped dome is elastic and provided opposite of the first ring-shaped dome. The holding disk may for example comprise a generally cylindrical section with the through hole, wherein the first and second ring-shaped domes are provided on opposite ends of the cylindrical section, seen in its axial direction. Accordingly, the holding disk may be a double spring cup. The second ring-shaped dome may further be designed to contact a surface of a component, which is carrying the fastening stud. The second ring-shaped dome may be elastically deformed upon mounting of the fastening stud in the insertion section being guided through the through holes of the holding disk and the component. According to this embodiment, the holding disk with its two opposite ring-shaped domes is held between the surface of the component carrying and surrounding the fastening stud on the one hand side and the component to be fastened on the fastening stud, on the other hand side. Both ring-shaped domes may be elastically deformed in this fully mounted position. The provision of the holding disk as a double spring cup leads to a higher pretension between the fastening device and the component, for example a paneling part of an automobile. For fully mounting the fastening device with the component on the fastening stud, an "overpressing" of the holding disk is necessary. Upon a subsequent release of the fastening device, the fastening device fulfills a slight movement away from the fastening stud until an engagement of the fastening device on the fastening stud occurs, for example through an engagement of holding teeth of holding arms of the holding device in a thread of the fastening stud. The pretension provided by the double spring cup embodiment of the holding disk securely provides this engagement of the fastening device.

The first ring-shaped dome and/or the second ring-shaped dome may comprise one radial slit or slot or may comprise a plurality of radial slits or slots. Through the provision of suitable slits or slots in one or both of the ring-shaped domes the forces necessary for the overpressing of the holding disk during mounting on the fastening stud may be precisely set. The necessary mounting forces and therefore also the achieved pretensioning forces between the fastening device and the component to be fastened on the fastening stud may be adjusted through the length and/or the width of the individual slits or slots.

Figure 2:
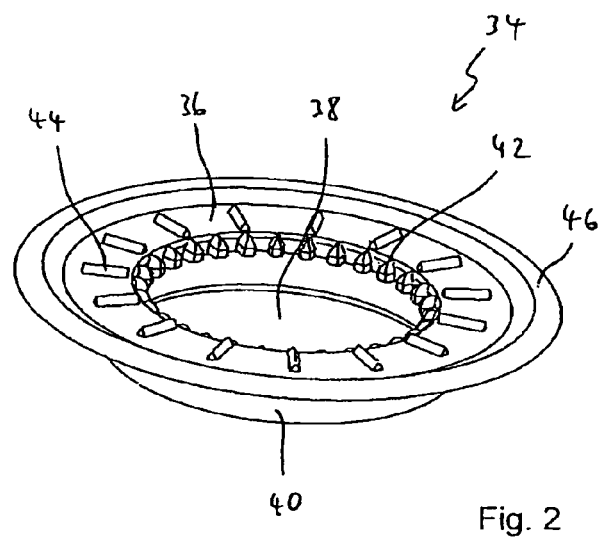
Figure 3:
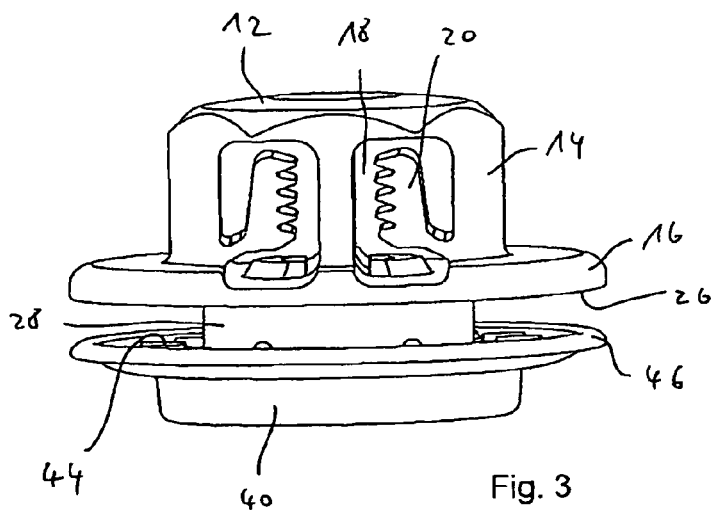
Figure 4:
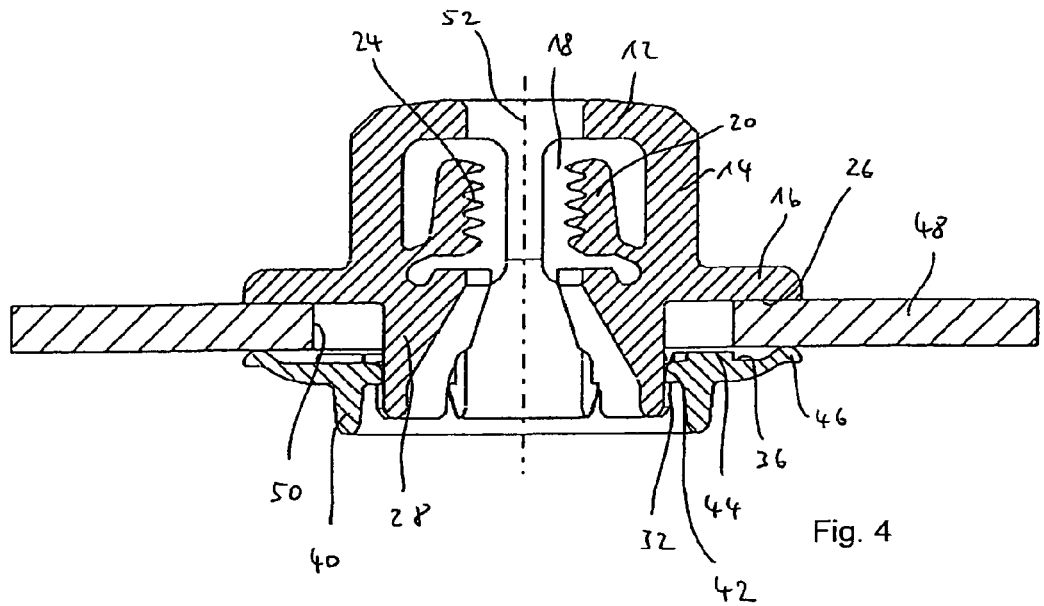
Figure 5:
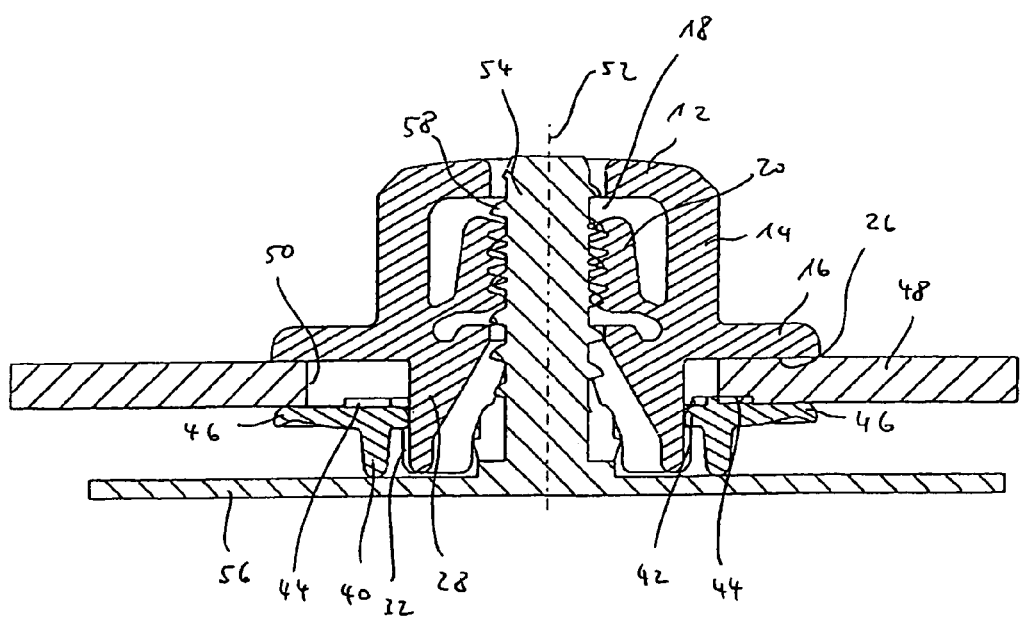
Figure 6:
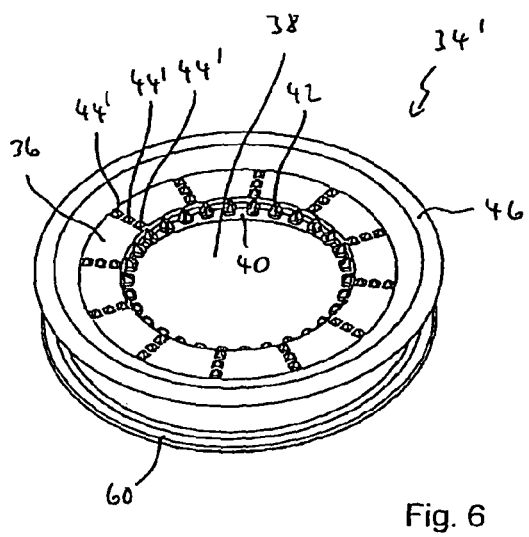
Figure 7:
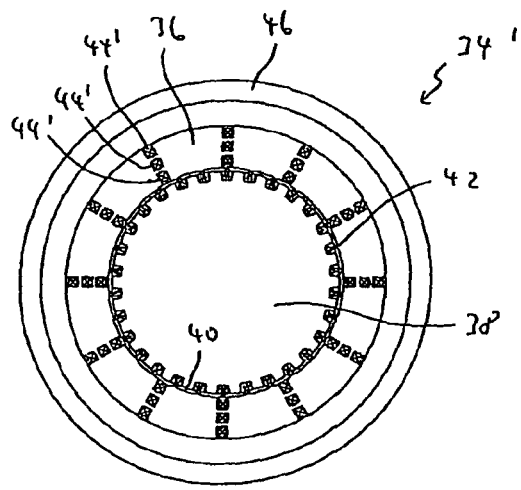
Figure 8:
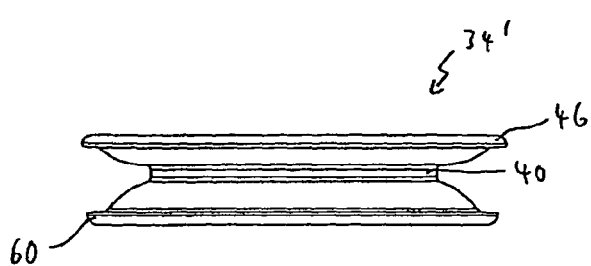
Figure 9:
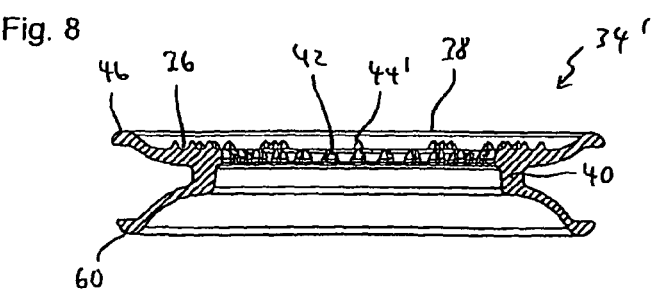
Figure 10:
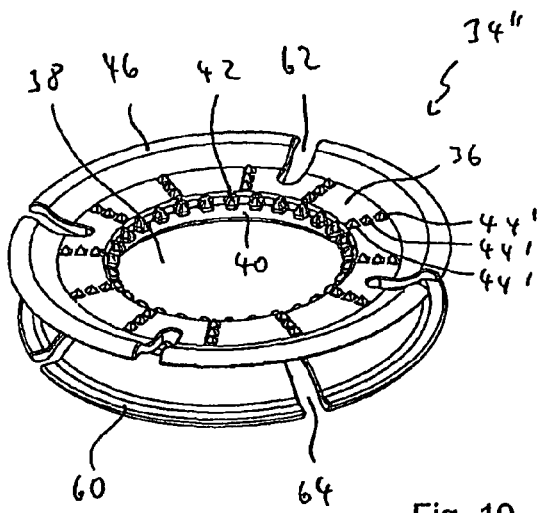
Figure 11:
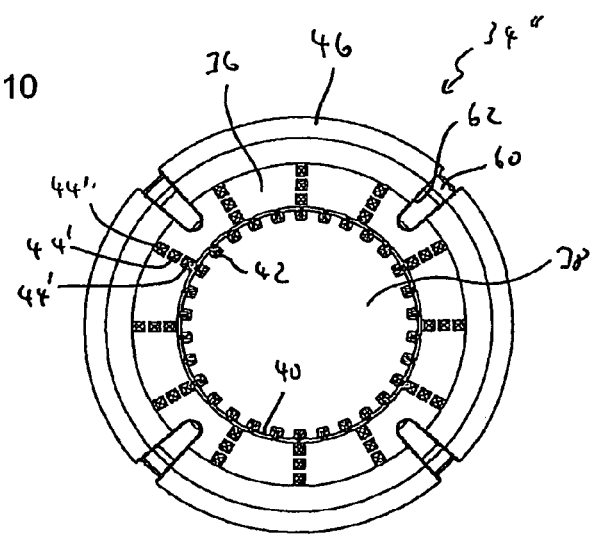
Figure 12:
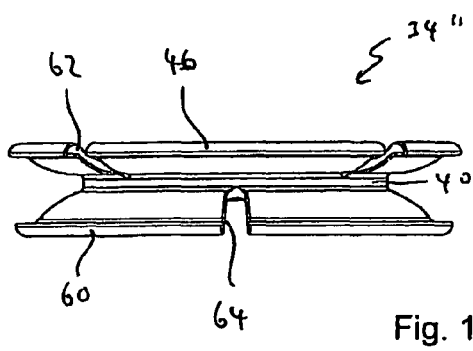
Figure 13:
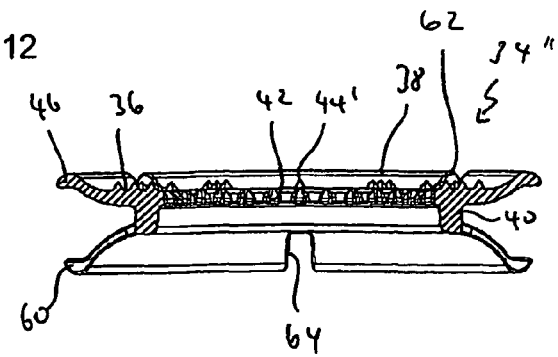

An exemplary embodiment of the invention is explained below in greater detail using figures. The drawing shows schematically in:

FIG. 1 a holding member of a device according to the invention in a perspective side view, FIG. 2 a holding disk of a device according to the invention in a perspective view, FIG. 3 the holding member from FIG. 1 and the holding disk from FIG. 2 in a preliminarily mounted state without component in a perspective view, FIG. 4 the holding member from FIG. 1 and the holding disk from FIG. 2 in the state preliminarily mounted on a component in a vertical cut view, FIG. 5 the device from FIG. 4 in a state mounted on a fastening stud in a vertical cut view, FIG. 6 a holding disk of a device according to the invention in a perspective view according to a further embodiment, FIG. 7 The holding disk of FIG. 6 in a top view, FIG. 8 the holding disk of FIG. 6 in a side view, FIG. 9 the holding disk of FIG. 6 in a vertical cut view, FIG. 10 a holding disk of a device according to the invention in a perspective view according to a further embodiment, FIG. 11 the holding disk of FIG. 10 in a top view, FIG. 12 the holding disk of FIG. 10 in a side view, FIG. 13 the holding disk of FIG. 10 in a vertical cut view.

If not specified otherwise, the same reference numbers are used for the same objects in the figures. FIG. 1 shows a holding member 10 of a device according to the invention. The holding member 10 has a head 12, which is connected with a collar 16 via several bars 14. The bars 14 form together with the head 12 an insertion section 18, which delimits a mainly cylindrical chamber for a fastening stud. A holding device 20 in the form of a holding arm 20 is arranged on each set of two bars 14 arranged in pairs opposite each other. Each set of holding arms 20 is elastically attached at its bottom end in FIG. 1 via an elastic connection section 22 to an inner surface of the respective bar 14 of the insertion section 18. Each of the holding arms 20 has a plurality of teeth 24 protruding radially inward.

The bottom side of the collar 16 forms a circular contact surface 26 for contacting a component. A cylindrical section 28 extends centrally and downward in FIG. 1 from an inner edge of the collar 16. The cylindrical section 28 has, like the collar 16, a mainly circular through hole so that a fastening stud in FIG. 1 can be pushed from below into the insertion section 18. In the shown example, two opposite-lying, elastic locking projections, one of which is labeled with the reference number 30 in FIG. 1, are located on the bottom (in FIG. 1), free end of the cylindrical section 28. An outer gearing 32 with several teeth is provided on the two other sections of the free end of the cylindrical section 28 arranged opposite the locking projections 30 each offset by 90° and also lying opposite each other.

FIG. 2 shows a holding disk 34 of a device according to the invention. The holding disk 34 has a circular disk section 36 with a central through hole 38. Starting from the inner edge of the disk section 36, a cylindrical section 40 extends downward in FIG. 2. In the upper area of the cylindrical section 40 in FIG. 2, an inner gearing 42 is designed with a plurality of teeth. The top side of the disk section 36, which can be seen in FIG. 2, simultaneously forms a contact surface for contacting a component. A plurality of fastening projections 44 that each run in the radial direction and are triangular in cross-section are distributed evenly over the circumference of the disk section 36 on the contact surface. The fastening projections 44 are provided to be in contact in the final mounted state of the device with an associated contact surface of a component to be fastened and to grip in it. An annular circumferential dome 46 is arranged on the outer circumference of the disk section 36. The holding disk 34 shown in FIG. 2 is designed elastically. In the unstressed state of the holding disk 34 shown in FIG. 2, the dome 46 is higher than the fastening projections 44. In the case of the occurrence of a corresponding force, the holding disk 34 and with it the dome 46 can be elastically deformed like a type of spring plate, e.g. on its outside downward.

Both the holding member 10 shown in FIG. 1 as well as the holding disk 34 shown in FIG. 2 are made of a single piece of plastic in a plastic injection-molding process.

Based on the FIGS. 3 and 4, the preliminary connection between the holding member 10 and the holding disk 34 should be illustrated from FIGS. 1 and 2. For the sake of clarity, the component to be fastened with the device on a fastening stud is not shown in FIG. 3. The preliminary fastening of the device shown in FIG. 3 on a component 48 to be fastened on a fastening stud is however shown in a vertical cut view in FIG. 4. Component 48 can for example be a panelling part to be fastened on a vehicle body. The component 48 has a circular through hole 50 in the shown example. It can be seen in FIGS. 3 and 4 that the holding member 10 with its cylindrical section 28 can be pushed into the cylindrical section 40 of the holding disk 34. The locking projections 30 of the holding member 10 thereby deform first inward and, during full insertion of the holding member 10 into the holding disk 34, reach under the inner gearing 42 of the cylindrical section 40 of the holding disk 34. They thereby move back into their initial position and lock below the inner gearing 42. The teeth of the outer gearing 32 designed on the cylindrical section 28 of the holding member 10 simultaneously engage with the teeth of the inner gearing 42. In particular, it can be seen in FIG. 4 that the holding member 10 with its collar 16 and in particular the contact surface 26 rests on the top side of the component 48. It can simultaneously be seen that, in this premounted position of the device, the fastening projections 44 of the holding disk 34 do not yet engage with the component 48 and in particular its bottom side. Rather, the dome 46 lies on the bottom side of the component 48 and thereby establishes a sufficient distance in order to prevent contact between the fastening projections 44 and the bottom side of the component 48. It can also be seen in FIG. 4 that the through hole 50 of the component 48 is greater than the circumference of the cylindrical section 28 of the holding member 10 (and greater than the circumference of the cylindrical section 40 of the holding disk 34). In the premounted position shown in FIG. 4, the device can thus be pushed out of holding member 10 and holding disk 34 into the insertion section 18 in a direction perpendicular to the insertion direction of a fastening stud running along the axis 52 shown in FIG. 4, i.e. laterally to the left and to the right in FIG. 4. In this manner, position tolerances between the component 48 and its through hole 50 on one hand and the position of a fastening stud attached to a body part of an automobile on the other hand are balanced.

This can be seen in FIG. 5, which shows a vertical cut of the device according to the invention in the final mounted state on a fastening stud 54. The fastening stud 54 is designed in the shown example as one piece on an automobile body sheet 56. The fastening stud 54 has an external thread 58 in the shown example. As can be seen in FIG. 5, the device was shifted laterally out of holding member 10 and holding disk 34 opposite the through hole 50 of the component 48 for adjustment to the position of the fastening stud 54. For the mounting of the device and in particular the fastening of the component 48 on the fastening stud 54, the thusly positioned device was pushed onto the fastening stud 54. The fastening stud 54 thereby enters the insertion section 18 and the outer thread 58 of the fastening stud 54 engages with the teeth 24 of the holding arms 20. The bottom side of the cylindrical section 40 of the holding disk 34 thereby simultaneously comes in contact with the top side of the automobile body sheet 56 and leads to a force acting on the holding disk 34 in the insertion direction of the fastening stud 54, i.e. upwards in FIG. 5. This in turn leads to an elastic deformation of the holding disk 34. In particular, the sliding dome 46 is pushed downward, as shown in FIG. 5. At least some of the fastening projections 44 thereby come in contact with the bottom side of the component 48 and grip in it. It can also be seen in FIG. 5 that, due to the strong lateral shift in the example selected for visualization, some of the fastening projections 44 do not come in contact with the component 48, since they are located within the through hole 50. It can also be seen that the holding member 10 with the free bottom end of its cylindrical section 28 does not come in contact with the automobile body sheet 56. The holding member 10 thereby acts as a counter bearing and leads to the described deformation of the holding disk 34. In the final mounted state shown in FIG. 5, the component 48 is securely fastened on the fastening stud 54 and thus on the automobile body sheet 56. An undesired twisting or other loosening of the device and thus the component 48 is securely avoided. Mounting is simultaneously simple and a comprehensive balance of position tolerances is possible.

FIGS. 6 to 9 show a further embodiment of a holding disk 34' according to the invention. This holding disk 34' is largely identical to the holding disk 34 shown in FIG. 2. It can be seen from a comparison of for example FIGS. 6 and 2 however, that instead of the fastening projections 44 of FIG. 2, the holding disk 34' of FIGS. 6 to 9 comprises in each case three fastening projections 44', each arranged in a radial direction. It can further be seen that the holding disk 34' of FIGS. 6 to 9 comprises a second ring-shaped dome 60 which is also elastic. The first ring-shaped dome 46 and the second ring-shaped dome 60 are provided on opposite ends of the cylindrical section 40. Accordingly, the holding disk 34' of FIGS. 6 to 9 forms a double spring cup. The assembly of the fastening device and the component 48 on the automobile body sheet 56 with the fastening stud 54 takes place in the same manner as described above for the holding disk 34 of FIG. 2. In the fully assembled position, as generally shown in FIG. 5, both ring-shaped domes 46, 60 are elastically deformed between the lower surface of the component 48 and the upper surface of the automobile body sheet 56 as seen in FIG. 5. The holding disk 34' in the form of a double spring cup provides an additional pretension between the inventive fastening device and the component 48.

FIGS. 10 to 13 show a holding disk 34" according to a further embodiment of the invention. The holding disk 34" shown in FIGS. 10 to 13 is largely identical to the holding disk 34' shown in FIGS. 6 to 9. Different from the holding disk 34' from FIGS. 6 to 9, the holding disk 34" from FIGS. 10 to 13 comprises a plurality of radial slits 62 in the first ring-shaped dome 46 and a plurality of radial slits 64 in the second ring-shaped dome 60. In the example shown in FIGS. 10 to 13, each of the first ring-shaped dome 46 and the second ring-shaped dome 60 comprises four slits 62, 64 provided at regular angular distances about the circumference of the first and second ring-shaped dome 46, 60. It can be seen for example from FIG. 10 that there is an angular offset between each of the slits 62 in the first ring-shaped dome 46 and each of the slits 64 in the second ring-shaped dome 60. In the example shown, the slits 62 in the first ring-shaped dome 46 extend into the disk section 36. The slits 62, 64 allow a precise and targeted definition of the elasticity of the ring-shaped dome 46, 60 and thus the forces necessary to deform the ring-shaped dome 46, 60 during assembly as well as their pretensioning force exerted on the component 48 and the automobile body panel 56.

The invention claimed is:

1. Device for fastening a component to a fastening stud, comprising
a holding member with a contact surface for contacting a first surface of the component and with an insertion section for a fastening stud being guidable through a through hole of the component, wherein the insertion section comprises at least one holding device for holding the fastening stud, and
a holding disk with a through hole for the fastening stud and with a contact surface for contacting a second surface of the component being opposite the first surface, characterized in
that the holding disk comprises a plurality of fastening projections in the area of its contact surface,
that preliminary connection means are provided, with which the holding member and the holding disk can be preliminary connected with one another without the fastening stud each in the state contacting the component, and,
that the holding disk comprises at least one elastic distance member which prohibits the fastening projections from contacting the second contact surface of the component when the holding member and the holding disk are preliminarily connected with one another, so that the device is moveable with regard to the component in a direction perpendicular to the moving direction of the fastening stud through the through hole of the holding disk, and wherein the distance member is elastically deformed upon mounting of the fastening stud in the insertion section being guided through the through holes of the holding disk and the component, such that the fastening projections can contact the second contact surface of the component.

2. Device according to claim 1, wherein the preliminary connection means comprise a locking connection.

3. Device according to claim 2, wherein the holding member comprises a cylindrical section being insertable in the through hole of the component and also comprising a through hole, wherein the cylindrical section comprises at least one locking element being provided on a free end of the cylindrical section, and in that the holding disk comprises a cylindrical section comprising a through hole, wherein the cylindrical section comprises at least one locking element corresponding to the at least one locking element of the holding member wherein the cylindrical section of the holding member is insertable into the cylindrical section of the holding disk wherein the locking elements lock with each other for preliminary connecting the holding member and the holding disk.

4. Device according to claim 3, wherein the cylindrical section of the holding disk comprises an inner gearing and, in that the cylindrical section of the holding member comprises an outer gearing, wherein the outer gearing of the cylindrical section of the holding element engages with the inner gearing of the cylindrical section of the holding disk in the condition being inserted in the cylindrical section of the holding disk.

5. Device according to claim 1, wherein the holding disk projects at least in sections over the holding member in a direction opposite to the insertion direction of the fastening stud into the insertion section, when the holding member and holding disk are preliminarily connected.

6. Device according to claim 1, wherein the holding device of the insertion section comprises at least two holding arms being elastically connected to an inner surface of the insertion section, wherein the holding arms comprise holding teeth, which are provided for engaging in an outer surface of the fastening stud.

7. Device according to claim 6, wherein the holding arms are each elastically connected to the inner surface of the insertion section at their end facing towards the insertion opening of the insertion section.

8. Device according to claim 6, wherein the holding arms each extend essentially parallel to the insertion direction of the fastening stud into the insertion section, wherein the teeth extend into the insertion section, starting from the holding arms.

9. Device according to claim 1, wherein the fastening projections of the holding disk are fastening ribs extending in a radial direction on the contact surface of the holding disk.

10. Device according to claim 1, wherein the fastening projections of the holding disk are cone-shaped or pyramid-shaped fastening projections.

11. Device according to claim 1, wherein the elastic distance member of the holding disk comprises a ring-shaped dome being provided radially outwards of the fastening projections, wherein the holding disk is elastic at least in the area of the dome.

12. Device according to claim 11, wherein the ring-shaped dome being provided radially outwards of the fastening projections is a first ring-shaped dome, and in that the holding disk comprises a second ring-shaped dome, wherein the second ring-shaped dome is elastic and provided opposite of the first ring-shaped dome.

13. Device according to claim 12, wherein the second ring-shaped dome is designed to contact a surface of a component carrying the fastening stud, and wherein the second ring-shaped dome is elastically deformed upon mounting of the fastening stud in the insertion section being guided through the through holes of the holding disk and the component.

14. Device according to claim 11, wherein the first ring-shaped dome and/or a second ring-shaped dome comprises one radial slit or a plurality of radial slits.

15. Device according to claim 1, wherein the first ring-shaped dome and/or a second ring-shaped dome comprises a circular continuous outer perimeter.

16. Device according to claim 1, wherein the fastening projections of the holding disk have triangular cross-sections lying on a plane normal to a longitudinal direction of the device.

17. Device according to claim 1, wherein the fastening projections are arrayed equidistantally at discrete locations about a longitudinal axis of the device, wherein tips of the projections are such that the tips at respective discrete locations align with the longitudinal axis of the device.

18. Device according to claim 1, wherein the fastening projections are arrayed equidistantally at discrete locations about a longitudinal axis of the device, wherein only one fastening projection is located at each discrete location.

19. Device according to claim 1, wherein the fastening projections are arrayed equidistantally at discrete locations about a longitudinal axis of the device, wherein more than one fastening projection is located at each discrete location.

20. Device according to claim 1, wherein device includes only one ring-shaped dome.

* * * * *

UNITED STATES PATENT AND TRADEMARK OFFICE
CERTIFICATE OF CORRECTION

| | | |
|---|---|---|
| PATENT NO. | : 8,899,894 B2 | |
| APPLICATION NO. | : 13/637648 | |
| DATED | : December 2, 2014 | |
| INVENTOR(S) | : Alexander Limpert et al. | |

It is certified that error appears in the above-identified patent and that said Letters Patent is hereby corrected as shown below:

On the title page item (54), and in the specification, col. 1, line 1, the Title should read as follows:

DEVICE FOR FASTENING A COMPONENT TO A FASTENING STUD

Signed and Sealed this
Eighteenth Day of August, 2015

Michelle K. Lee
*Director of the United States Patent and Trademark Office*